(12) United States Patent
LaPointe et al.

(10) Patent No.: US 6,659,071 B2
(45) Date of Patent: Dec. 9, 2003

(54) INTERNAL COMBUSTION ENGINE OPERABLE IN PCCI MODE WITH EARLY CONTROL INJECTION AND METHOD OF OPERATION

(75) Inventors: Leon A. LaPointe, Columbus, IN (US); Cariappa M. Chenanda, Columbus, IN (US); Tim R. Frazier, Columbus, IN (US); Robert M. Hurst, Columbus, IN (US); Lester L. Peters, Columbus, IN (US); Patrick M. Pierz, Columbus, IN (US); Axel O. zur Loye, Columbus, IN (US)

(73) Assignee: Cummins Inc., Columbus, IN (US)

( * ) Notice: Subject to any disclaimer, the term of this patent is extended or adjusted under 35 U.S.C. 154(b) by 200 days.

(21) Appl. No.: 09/850,187

(22) Filed: May 8, 2001

(65) Prior Publication Data

US 2002/0040692 A1 Apr. 11, 2002

Related U.S. Application Data

(60) Provisional application No. 60/202,850, filed on May 8, 2000.

(51) Int. Cl.$^7$ .............. F02B 17/00; F02B 3/12
(52) U.S. Cl. ............ 123/299; 123/305; 123/431; 123/295
(58) Field of Search ............ 123/299, 304, 123/526, 27 GE, 431, 305

(56) References Cited

U.S. PATENT DOCUMENTS

| | | |
|---|---|---|
| 1,128,463 A | 2/1915 | Lake |
| 1,132,581 A | 3/1915 | Hein |
| 2,909,159 A | 10/1959 | Britton |
| 2,977,942 A | 4/1961 | Reynolds |
| 4,193,382 A | 3/1980 | Oshima |

(List continued on next page.)

FOREIGN PATENT DOCUMENTS

| | | |
|---|---|---|
| DE | 332524 | 1/1921 |
| DE | 481070 | 8/1929 |
| DE | 195 19 663 A1 | 5/1996 |
| DE | 198 04 983 A1 | 8/1999 |
| DE | 198 10 935 A1 | 9/1999 |
| GB | 2 328 717 A | 3/1999 |
| GB | 2 353 070 A | 2/2001 |
| WO | WO 02/06652 A2 | 1/2002 |

OTHER PUBLICATIONS

Shigeru Onishi et al., "Active Thermo–Atmosphere Combustion (ATAC)—A New Combustion Process for Internal Combustion Engines", SAE Technical Paper No. 790501, Feb. 26–Mar. 2, 1979.

(List continued on next page.)

*Primary Examiner*—Erick Solis
(74) *Attorney, Agent, or Firm*—Nixon Peabody LLP; Tim L. Brackett, Jr.

(57) ABSTRACT

An internal combustion engine operable in a premixed charge compression ignition mode and a method for operating the engine, the engine including an engine body with a piston assembly, a combustion chamber formed in the engine body by the piston assembly, an intake system for delivering intake air to the combustion chamber during an intake stroke, a mixing device that mixes a first fuel with the intake air to provide a premixed charge of air and the first fuel, a direct fuel injector adapted to directly inject a second fuel into the combustion chamber, and a control system adapted to control the direct fuel injector in a manner to provide at least one early control injection, and preferably, a plurality of early control injections of the second fuel into the combustion chamber before start of combustion of the premixed charge.

47 Claims, 3 Drawing Sheets

U.S. PATENT DOCUMENTS

| | | | |
|---|---|---|---|
| 4,445,468 A | | 5/1984 | Onishi et al. |
| 4,499,885 A | | 2/1985 | Weissenbach et al. |
| 4,524,730 A | | 6/1985 | Doell et al. |
| 4,543,930 A | * | 10/1985 | Baker .......................... 123/299 |
| 4,572,133 A | | 2/1986 | Bago |
| 4,719,880 A | | 1/1988 | Schlunke et al. |
| 4,768,481 A | | 9/1988 | Wood |
| 4,831,993 A | | 5/1989 | Kelgard |
| 5,060,610 A | | 10/1991 | Paro |
| 5,119,780 A | | 6/1992 | Ariga |
| 5,127,378 A | | 7/1992 | Ito |
| 5,237,812 A | | 8/1993 | Mumford |
| 5,265,562 A | | 11/1993 | Kruse |
| 5,365,902 A | | 11/1994 | Hsu |
| 5,467,757 A | | 11/1995 | Yanagihara et al. |
| 5,535,716 A | | 7/1996 | Sato et al. |
| 5,549,087 A | | 8/1996 | Gray, Jr. et al. |
| 5,609,131 A | | 3/1997 | Gray, Jr. et al. |
| 5,642,705 A | | 7/1997 | Morikawa et al. |
| 5,713,328 A | | 2/1998 | Anderson et al. |
| 5,740,775 A | | 4/1998 | Suzuki et al. |
| 6,032,617 A | | 3/2000 | Willi et al. |
| 6,067,954 A | | 5/2000 | Kudou et al. |
| 6,095,102 A | * | 8/2000 | Willi et al. ............. 123/27 GE |
| 6,116,208 A | | 9/2000 | Nishimura et al. |
| 6,227,151 B1 | | 5/2001 | Ma |
| 6,230,683 B1 | | 5/2001 | zur Loye et al. |
| 6,269,634 B1 | | 8/2001 | Yokota et al. |
| 6,276,334 B1 | | 8/2001 | Flynn et al. |
| 6,286,482 B1 | | 9/2001 | Flynn et al. |
| 6,360,531 B1 | | 3/2002 | Wiemero et al. |
| 6,363,908 B1 | | 4/2002 | Kerns |
| 6,382,177 B1 | | 5/2002 | Saito |
| 6,578,545 B1 | * | 6/2003 | Hultquist et al. ........... 123/299 |

OTHER PUBLICATIONS

Masaaki Noguchi et al., "A Study on Gasoline Engine Combustion by Observation of Intermediate Reactive Products during Combustion", SAE Technical Paper No. 790840, Sep. 10–13, 1979.

Paul M. Najt et al, "Compression–Ignited Homogeneous Charge Combustion", SAE Technical Paper No. 830264, (1983).

Haruyuki Yokota et al., A New Concept for Low Emission Diesel Combustion:, JASE Automobile Technology, vol. 51, No. 9, 1997, pp. 47–52.

Haruyuki Yokota et al., "A New Concept for Low Emission Diesel Combustion", SAE Technical Paper No. 970891, Feb. 24–27, 1997.

J. Ray Smith, et al., "Homogeneous Diesel Combustion", Jun. 18, 1996, pp. 1–4.

"Clean Heavy–Duty Diesel Engine–II Program—Homogeneous Charge Compression Ignition (HCCI) of Diesel Fuel", SWRI Project No. 03–7479, Southwest Research Institute, Nov. 1997.

* cited by examiner

INTERNAL COMBUSTION ENGINE OPERABLE IN PCCI MODE WITH EARLY CONTROL INJECTION AND METHOD OF OPERATION

This application claims priority to U.S. Provisional Application No. 60/202,850 filed on May 8, 2000.

BACKGROUND OF THE INVENTION

1. Field of the Invention

The present invention is directed to an improved internal combustion engine for increasing fuel efficiency while reducing exhaust emissions and a method of operating such an engine. In particular, the present invention is directed to such an engine operable in a premixed charge compression ignition

2. Description of Related Art

Relatively recently, because of the increased regulatory pressure for fuel efficient and low emissions engines, some engine designers have directed their efforts to one type of an internal combustion engine which utilizes premixed charge compression ignition (PCCI). Researchers have used various other names in referencing PCCI combustion including homogeneous charge compression ignition (HCCI) as well as others such as "ATAC" which stands for "Active Thermo-Atmosphere Combustion." (SAE Technical Paper No. 790501, Feb. 26–Mar. 2, 1979), "TS" which stands for "Toyota-Soken" (SAE Technical Paper No. 790840, Sep. 10–13, 1979), and "CIHC" which stands for "compression-ignited homogeneous charge" (SAE Paper No. 830264, 1983). All of these terms are hereinafter collectively referred to as PCCI.

Generally, conventional internal combustion engines are either a diesel or a spark ignited engine, the diesel engine controlling the start of combustion (SOC) by the timing of fuel injection while a spark ignited engine controls the SOC by the spark timing. Initially, it should be understood that SOC refers to the point in time at which a charge within the cylinder begins to ignite. The major advantage that a spark ignited natural gas or gasoline engine has over a diesel engine is its ability to achieve extremely low NOx and particulate emissions levels. Premixed charge spark ignited engines have nearly homogeneous air fuel mixtures which tend to be either lean or close to stoichiometric, resulting in very low particulate emissions. The major advantage that diesel engines have over premixed charge spark ignited engines is in its higher thermal efficiency. Typical diesel engines, however, cannot achieve the very low NOx and particulate emissions levels which are possible with premixed charge spark ignited engines.

Another type of engines that has been recent focus of research and has been proposed and studied is direct injection natural gas engines that utilizes compression ignition. In such engines, highly pressurized natural gas is injected directly into the combustion chamber during or after compression so that the heat generated by compression ignites the injected natural gas in a manner similar to that of diesel injection applications. Such direct injection natural gas engines allow higher compression ratios than spark ignition natural gas engines. Hence, the gross thermal efficiency of direct injection natural gas engines is known to be higher than that of spark ignition natural gas engines. However, direct injection natural gas engines require the natural gas to be compressed to very high pressures such as 3000 psi or greater which is very difficult to attain. This required compression process requires substantial amount of work which reduces the brake thermal efficiency of direct injection natural gas engines. Consequently, whereas the emission performance in direct injection natural gas engines have been found to be better than conventional diesel engines, the higher emissions (as compared to spark ignited engines) as well as complexity and high cost of such engines have minimized their commercial appeal.

Unlike the above described internal combustion engines, engines operating on PCCI principles rely on autoignition of a relatively well premixed fuel/air mixture to initiate combustion. More specifically, in PCCI engines, the fuel and air are mixed in the intake or in the cylinder, long before ignition occurs. The extent of the mixture may be varied depending on the combustion characteristics desired. Some engines may be designed and/or operated to ensure that the fuel and air are mixed into a homogeneous, or nearly homogeneous, state. Also, an engine may be specifically designed and/or operated to create a somewhat less homogeneous charge having a small degree of stratification. In both instances, the mixture exists in a premixed state well before ignition occurs and is compressed until the mixture autoignites. Thus, PCCI combustion event is characterized in that: 1) the majority of the fuel is sufficiently premixed with the air to form a combustible mixture throughout the charge at the time of ignition; and 2) ignition is initiated by compression ignition. In addition, PCCI combustion is also preferably characterized in that most of the mixture is significantly leaner than stoichiometric to advantageously reduce emissions, unlike the typical diesel engine cycle in which a large portion, or all, of the mixture exists in a rich state during combustion. Because an engine operating on PCCI combustion principles has the potential for providing the excellent fuel economy of the diesel engine while providing NOx and particulate emissions levels that are much lower than that of current spark ignited engine, it has also recently been the subject of extensive research and development.

It is now known that for efficient, low emission PCCI combustion, it is important to have the combustion event occur at an appropriate crank angle during the engine cycle. In this regard, it has further been found that the timing of SOC and the combustion rate (therefore combustion duration) in a PCCI engine primarily depend on various combustion history values such as the temperature history; the pressure history; fuel autoignition properties (e.g. octane/methane rating or activation energy); and trapped cylinder charge air composition (oxygen content, EGR, humidity, equivalence ratio etc.). However, it should be understood that the term PCCI does not exclude the use of ignition timing mechanisms such as pilot injections and spark ignition known in the art that are used to precisely time the ignition of the premixed charge. Whereas the premixed charge may combust due to compression, such ignition timing mechanisms aid in initiating the SOC of the premixed charge at a precise time to ensure desirable combustion characteristics. This is in contrast to non-PCCI engines such as conventional gasoline engines with spark ignition in which the premixed charge of gasoline and air would not ignite at all without the spark.

A premixed charge compression ignition engine with optimal combustion control with various control features for controlling SOC and the combustion rate is disclosed in the patent application Ser. No. 08/916,437 filed on Aug. 22, 1997, currently assigned to the Assignee of the present invention. This application has also been published as International Patent Application No. PCT/US97/14815. As disclosed in the '437 application, active control is desirable to maintain the SOC and duration of combustion at the desired location of the crankshaft and at the desired duration, respectively, to achieve effective, efficient PCCI combustion with high efficiency and low NOx emissions. In this regard, the '437 application discloses a PCCI engine comprising a combustion history control system that includes at least one of a temperature control system for varying the temperature of the mixture of fuel and air, a pressure control system for varying the pressure of the mixture, an equivalence ratio control system for varying an equivalence ratio of the mixture and a mixture autoignition property control system for varying an autoignition property of the mixture.

The engine uses an operating condition detecting device that detects an engine operating condition and provides a corresponding signal to a processor that generates one or more control signals to control the combustion history control system such as the temperature control system, the pressure control system, the equivalence ratio control system and/or the mixture autoignition property control system. In this manner, variable control of the combustion history of future combustion events may be attained. A start of combustion (SOC) sensor such as a cylinder pressure sensor may be used to sense the start of combustion so that effective feedback control may be also attained.

Due to the difficulties in controlling the timing of the SOC in a PCCI combustion event, variations of engines operating in a PCCI mode have been proposed including internal combustion engines that operate in a dual fuel mode in which the engine operates in a conventional diesel mode, a PCCI mode, or a combination thereof. For instance, the '437 application further discloses such an engine which may be operated in different modes and the use of an injector to inject additional gas or liquid such as diesel fuel into the cylinder to time the PCCI combustion event. It should be understood that the term PCCI does not exclude the use of ignition timing mechanisms such as injections and spark ignition known in related art that are used to precisely time the ignition of the premixed charge. Whereas the premixed charge would combust due to compression, such ignition timing mechanisms aid in initiating the SOC of the premixed charge at a precise time to ensure desirable combustion characteristics.

In this regard, the '437 application discloses that the diesel fuel may be injected either early in the compression event or later in the compression event near top dead center (TDC) to initiate a PCCI combustion event. Thus, the late injection adds a small amount of stratified fuel which is compression ignited to help control the ignition of the premixed fuel during the PCCI combustion event. Such early injection has been found to be advantageous in that it provides an effective way to initiate and control ignition of the premixed charge and to control SOC in a PCCI engine.

In addition, other PCCI type engines have been proposed in which a pilot injection of diesel fuel is directly injected into the premixed charge late in the combustion cycle such as near top dead center to ignite the premixed charge to thereby allow precise timing of the SOC. However, in contrast with true PCCI engines in which sufficient premixed charge is provided to allow autoignition of the premixed charge due to compression, these types of engines do not provide the proper conditions (such as gas temperature and pressure near TDC) for autoignition to occur. Thus, without the pilot injection which acts as the ignition source by providing a flame front (or some other ignition mechanism), no ignition of the premixed charge would occur. Thus, these types of engines do not combust the premixed charge in a true PCCI event and are somewhat similar to conventional gasoline engines with spark ignition in which the premixed charge would not ignite at all without the spark or other flame propagation mechanism.

Despite these significant recent developments in the technology of internal combustion engines, there still exists an unfulfilled need to further increase the fuel efficiency of internal combustion engines while minimizing exhaust emissions. These further improvements to exhaust emissions are desirable and necessary to ensure meeting the ever increasingly stringent government emissions requirements, especially with respect to NOx emission levels which has been difficult to reduce further using the presently known technology and methods.

SUMMARY OF THE INVENTION

In view of the foregoing, it is an object of the present invention to provide an internal combustion engine and method that operates in a premixed charge compression ignition mode with increased fuel efficiency.

Another object of the present invention is to provide such an engine and method that reduces exhaust emissions.

Still another object of the present invention is to provide such an engine and method which allows sufficient early control injection to be injected into the combustion chamber to properly control start of combustion while minimizing possibility of fuel spray impinging on the combustion chamber walls.

In accordance with one embodiment of the present invention, these objects are attained by an internal combustion engine operable in a premixed charge compression ignition mode and a method for controlling the engine, the engine comprising an engine body with a piston assembly, a combustion chamber formed in the engine body by the piston assembly, an intake system for delivering intake air to the combustion chamber during an intake stroke, a mixing device that mixes a first fuel with the intake air to provide a premixed charge of air and the first fuel, a direct fuel injector adapted to directly inject a second fuel into the combustion chamber, and a control system adapted to control the direct fuel injector in a manner to provide at least one early control injection of the second fuel into the combustion chamber before start of combustion of the premixed charge. The early control injection of the second fuel is preferably injected into the combustion chamber during at least one of the intake stroke and a compression stroke during which the premixed charge is compressed in the combustion chamber. In one embodiment, the early control injection of the second fuel may be injected into the combustion chamber during the intake stroke to allow sufficient mixing of the second fuel with the intake air. The mixing device may include at least one of a carburetor, a throttle body injector, and a port fuel injector that is adapted to mix air and the first fuel upstream of the combustion chamber.

In accordance with various embodiments of the present invention, the control system may be adapted to control at least one of injection timing, injection duration, injection rate and injection amount of the early control injection. The control system may also be adapted to variably control the amount of the second fuel injected during the early control injection by the direct fuel injector based on at least one of an operating condition and operating mode of the internal combustion engine. The timing and amount of the early control injection may be variably controlled based on desired timing of start of combustion of the premixed charge.

In accordance with another embodiment, the at least one early control injection is less than 10 percent of the fuel to be combusted and preferably less than 5 percent. At least one of the first fuel and the second fuel may be at least one of diesel, natural gas, gasoline, propane, naphtha, and kerosene. In one embodiment, the first fuel and the second fuel are different types of fuels.

In another preferred embodiment, the at least one early control injection is a plurality of early control injections. In this regard, each of the plurality of early control injections are less than 10 percent of the fuel to be combusted, and preferably less than 5 percent of the fuel to be combusted. In another embodiment, each of the plurality of early control injections are separated by a time gap sufficient to allow mixing of a control injection prior to beginning another control injection and/or sufficient to allow the direct injector to recover from a control injection prior to beginning another control injection. In this regard, each of the plurality of early control injections may be separated by a time gap. The time gap between each of the plurality of early control injections is preferably sufficient to allow mixing of an early control injection prior to beginning another early control injection and/or sufficient to allow the direct fuel injector to recover from an early control injection prior to beginning another early control injection. The time gap may be between 500 $\mu$sec and 2500 $\mu$sec, preferably approximately 1250 $\mu$sec.

In still another embodiment, the engine body includes a plurality of cylinders each having a piston assembly that forms a combustion chamber, and the control system is further adapted to vary the amount of the second fuel injected by the direct fuel injector during the plurality of early control injections fewer than all of the plurality of cylinders at a time.

These and other objects, features and advantages of the present invention will become more apparent from the following detailed description of the preferred embodiments of the present invention when viewed in conjunction with the accompanying drawings.

DETAILED DESCRIPTION OF THE PREFERRED EMBODIMENT

The present invention as described in further detail herein below provides an improved internal combustion engine operable in a premixed charge compression ignition mode as well as a method of operating such an engine that improves fuel efficiency while reducing exhaust emissions which may be harmful to the environment. In this regard, it should be initially noted that the embodiment of the present invention discussed in further detail below is merely one embodiment of an internal combustion engine in which natural gas is used to provide the premixed charge and diesel is used to provide the early control injection. As previously noted, PCCI combustion event is characterized in that: 1) the majority of the fuel is sufficiently premixed with the air to form a combustible mixture throughout the charge at the time of ignition; and 2) ignition is initiated by compression ignition. An embodiment in which natural gas is used for the premixed charge and diesel is used to provide the early control injection has been extensively studied by the present applicants and is discussed in further detail below. However, it should be understood that in other embodiments, the present invention may be applied to internal combustion engines that use different fuels for providing the premixed charge and the early control injection including (but not limited to) natural gas, gasoline, propane, diesel, kerosene, naphtha and/or other fuels.

Figure 1:
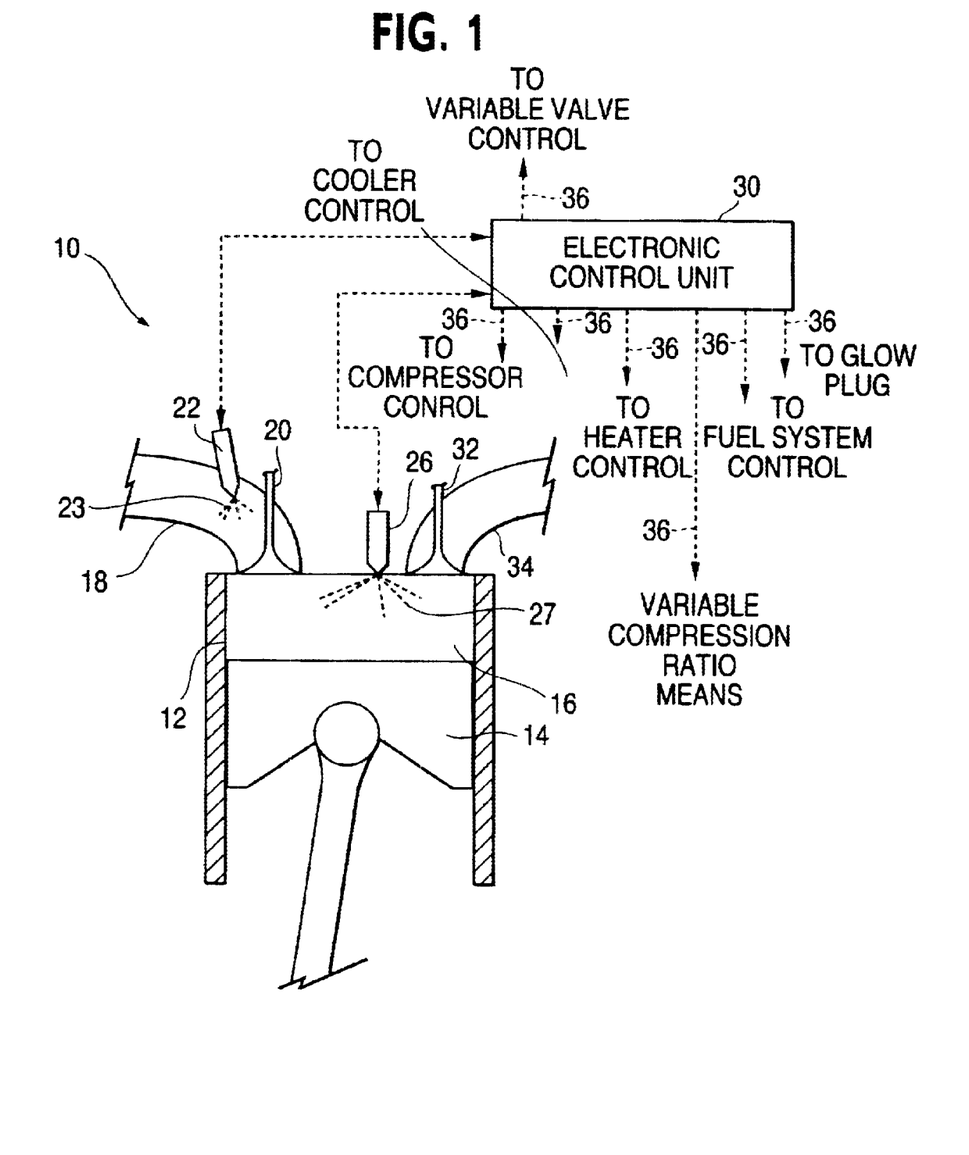
FIG. 1 is a schematic diagram of a single cylinder of an internal combustion engine in accordance with one embodiment of the present invention.

FIG. 1 generally illustrates an example internal combustion engine 10 that is operable in a PCCI mode in accordance with one embodiment of the present invention. As illustrated, the internal combustion engine 10 includes an engine body 12 with a piston assembly 14 reciprocally mounted therein. The piston assembly 14 forms a combustion chamber 16 in the engine body 12 in a manner well known in the art. The internal combustion engine 10 also includes an intake system 18 for delivering intake air to the combustion chamber 16 through an intake valve 20. It should be noted that although only one cylinder is illustrated in FIG. 1, the present invention may be utilized in internal combustion engines of various configurations including engines having any number of cylinders, for example, four, five, six, eight, ten, twelve, or sixteen cylinders, etc.

In accordance with the illustrated embodiment, the internal combustion engine 10 includes a mixing device such as port fuel injector 22 that is adapted to mix intake air and a first fuel 23 upstream of the combustion chamber 16 to thereby provide premixed charge of air and the first fuel 23 to the combustion chamber 16. Again, in the illustrated embodiment, the first fuel 23 is natural gas but in other embodiments, the first fuel 23 may be gasoline or other types of fuels or blends thereof as well. In addition, it should also be noted that other mixing devices may be used instead of the port fuel injector 16 such as a carburetor or a throttle body injector. This premixed charge of air and the first fuel 23 is provided into the combustion chamber 16 so that the piston assembly 14 compresses the premixed charge during a compression stroke so as to allow PCCI event to occur within the combustion chamber.

However, prior to the PCCI event of the premixed charge by the increased temperature and pressure due to the compression by the piston assembly, at least one early control injection is provided in accordance with the present invention as discussed herein. In this regard, the internal combustion engine 10 in accordance with the present invention is further provided with a direct fuel injector 26 that is adapted to directly inject at high pressure, an early control injection of second fuel 27 into the combustion chamber 16, preferably during the intake stroke and/or the compression stroke. The control injection of second fuel 27 is "early" in the sense that it is provided before the ignition of the premixed charge in a PCCI event. In addition, as will be further explained below, this early injection of the second fuel 27 is a "control injection" in the sense that it can be readily used to control the timing of the start of combustion (SOC) of the PCCI event during which the premixed charge is autoignited by compression in the combustion chamber 16. As previously noted, it should be understood that SOC refers to the point in time at which a charge within the cylinder begins to ignite. Moreover, the early control injection in accordance with the present invention should not be confused with the early pilot injections that are provided late in the compression stroke as known in the art since as described previously, such early pilot injections are actually required in such applications to provide a localized ignition source such as a flame front that ignites the premixed charge and thus, combustion cannot be considered a true PCCI combustion.

In the presently described embodiment of FIG. 1, the second fuel 27 is diesel which has been found by the present inventors to provide very desirable ignition and combustion properties when used in conjunction with the natural gas used for the first fuel 23. Diesel has been found to be a good choice as a high cetane number fuel for controlling SOC because diesel releases a large fraction of its energy at relatively low temperatures which makes diesel fuel easy to compression ignite. This embodiment has been found to allow the temperature and composition of the premixed charge to be changed quickly during the intake and/or compression stroke of the piston assembly 14 on a cycle-by-cycle basis allowing for very rapid control of SOC. However, it should be kept in mind that other types of fuels or blends thereof may be used as well in other embodiments.

The direct fuel injector 26 is communicatively connected to a control system such as the electronic control unit (ECU) 30 shown in the embodiment of FIG. 1 that is adapted to control the direct fuel injector 26 in the manner described. In particular, the ECU 30 is adapted to rapidly control the direct fuel injector 26 in a manner to provide at least one early control injection where the second fuel 27 is directly injected into the combustion chamber 16 prior to the SOC of the premixed charge in the combustion chamber 16 in a PCCI event. The ECU 30 may include a processor such as a micro-controller, micro-processor, or other suitable micro-computing unit to control the direct fuel injector 26 or other components of the internal combustion engine 10 in a manner described in further detail below.

In addition, it should be noted that whereas FIG. 1 shows both the first fuel 23 being injected by the port fuel injector 22 as well as the second fuel 27 being injected by the direct fuel injector 26, these events typically would not occur simultaneously. As discussed, the port fuel injector 22 injects the first fuel 23 into the intake air to thereby provide a premixed charge which is then provided to the combustion chamber 16 through the intake valve 20. As the premixed charge is provided to the combustion chamber 16 during the intake stroke or thereafter during the combustion stroke, the direct fuel injector 26 injects the second fuel 27 into the combustion chamber 16 during the at least one early control injection.

As the premixed charge is compressed by the piston assembly 16, the temperature and pressure is substantially increased until the premixed charge ignites in a PCCI event. The piston assembly 14 is forced downwardly in the engine body 12 and the piston assembly 14 transmits forces generated by combustion to an engine drive system (not shown) which is generally known in the art. The combustion exhaust is removed from the combustion chamber 16 through the exhaust valve 32 and an exhaust system 34 which are also generally known in the art.

In the illustrated embodiment, the control system such as the ECU 30 is further adapted to control at least one of injection timing, injection duration, injection rate and injection amount of second fuel 27 injected by the direct fuel injector 26, and preferably, the mixing device such as the port fuel injector 22 as shown. The direct fuel injector 26 of the internal combustion engine 10 may then be controlled by the ECU 30 to variably control the direct fuel injector 26 in the manner further described below based on an operating condition of the internal combustion engine 10, the operating mode of the internal combustion engine 10, or other parameters. For instance, the above noted control of injection parameters may be based on measured or calculated SOC, temperature, load, speed, throttle position, quality of the fuel, etc. of the internal combustion engine 10 and/or as otherwise directed by the operator.

In this regard, it should be explained that the quality of the first fuel 23 that is to be injected by the mixing device such as the port fuel injector 22 may vary. Such is the case if the first fuel 23 is commercially available natural gas where the Methane number can change significantly from one geographic area to another as well as even one day to the next. The variation in fuel quality will also cause the timing of the SOC to vary as well. Thus, in accordance with the present invention, the early control injection can be used to control timing of the SOC in response to the quality of the first fuel 23. In this regard, a sensor (not shown) may be provided to sense the quality of the first fuel 23 and provide a signal to the ECU 30 so that timing of the SOC can be properly adjusted using the early control injection based on the fuel quality. Of course, such quality determination and compensation of SOC can be based on the quality of the second fuel 26 as well in other embodiments.

Moreover, the ECU 30 may also be adapted to generate a plurality of output signals indicated as 36, for variably controlling components associated with a combustion history control system which may include one or more of a variable valve control, compressor control, cooler control, heater control, variable compression ratio control, fuel system control, and/or glow plug as shown for varying the autoignition property of the mixture. These control systems can be used in conjunction with the early control injection in accordance with the present invention to further control SOC. The specific details of variably controlling components associated with combustion history control system has been discussed in the patent application Ser. No. 09/255,780 filed on Feb. 23, 1999, this application being currently assigned to the Assignee of the present invention and having also been published as an International Patent Application No. PCT/US99/03289, the entire contents of which is hereby incorporated by reference.

The significance of providing an early control injection in accordance with the present invention is explained herein. As previously noted, the diesel fuel may be injected as an early control injection during the intake stroke and/or the compression stroke. Such early control injection of diesel (second fuel) has been found by the present applicants to be very advantageous in that it provides an effective way to control the timing of SOC of the premixed charge in an engine operating in a PCCI mode. This control of timing of the SOC is significant because effective PCCI combustion under certain operating conditions is very difficult to obtain, for instance, during engine starting, low and high engine loads, transitioning between operating modes, or when the intake air and/or manifold temperature is low. In particular, the applicants have found that as the amount of fuel provided during the early control injection is increased, the timing of the SOC of the premixed charge is further advanced which is important especially during the above noted operating conditions. Whereas the known practice of providing a pilot injection to ignite the premixed charge also provides control of the timing of the SOC, it has been found that because such combustion is not true PCCI combustion, such operation of an engine results in reduced fuel efficiency and increased exhaust emissions thereby negating some of the benefits and motivation for pursuing an engine operable in a PCCI compression mode.

In further developing the present invention in which early control injection is provided during the intake and/or compression stroke to control the timing of SOC, the present applicants have found that there are some limitations in the use of the early control injection in accordance with the above described embodiment of the present invention, whether they are provided during the intake or the compression stroke. In particular, timing for the early control injection may typically be on the order of 100 crank angle degrees before top dead center (BTDC) although other crank angle degrees may be appropriate as well. It has been found that timing of the early control injection of the premixed charge is limited in the "retarded" direction by the mixing time required to avoid rich combustion and consequential high NOx generation. Another consideration is the possibility of raw fuel impinging on the walls of the combustion chamber 16 referred to herein as cylinder walls, and raw fuel being introduction into the exhaust. This limitation results from the fact that because the second fuel is injected early when the cylinder pressure of the premixed charge is relatively low, there is a strong possibility of the fuel spray of the early control injection impinging directly on the cylinder wall which is detrimental to efficient combustion and exhaust emissions. In addition, in certain applications, the timing as well as the amount of the early control injection is also limited in the "advanced" direction by the possibility of raw fuel impinging on the intake valve 20 when it is opened. The limitations in the quantity of fuel that can be injected during the early control injection has been found to be a significant problem by the present inventors in PCCI engine applications such as the internal combustion engine 10 of FIG. 1, especially when engine 10 is operated under light loads, is being transitioned from a conventional diesel operating mode to a PCCI operating mode, or when the intake air and/or manifold temperature is low. In such operating conditions, significant advance in the timing of SOC would be desirable to ensure proper PCCI combustion but due to the limitations discussed above which limit the timing of the early control injection, the timing of the SOC is also limited as a result so that the desired significant advance in timing of SOC cannot be readily attained.

In extensively studying the internal combustion engine 10 operable in a PCCI mode with a high pressure common rail diesel fuel system such as those manufactured by Cummins Engine Company, Inc. or Bosch, the present inventors found that in the above noted operating conditions, a relatively large quantity of second fuel such as approximately 10 mm$^3$ (which was substantially 10 percent of the total fuel to be combusted in the engine configuration used during the experiments) must be directly injected into the combustion chamber as an early control injection in order to advance timing of SOC during PCCI combustion as desired. Otherwise, during certain operating conditions, PCCI combustion would not occur unless the control injection or other ignition mechanism is provided. However, as previously described, the fuel spray of such large quantity directly injected into the combustion chamber 16 appears to impinge directly on the cylinder wall thereby causing inefficient combustion, increased exhaust emissions, and lube oil dilution.

This limitation in timing the SOC in the "advanced" direction has been confirmed by tests which were conducted using a high pressure spray visualization rig. Through extensive study, it has been found that impingement of the injected diesel fuel with the cylinder walls is avoided if the early diesel control injection from the nozzle is limited to substantially 5 percent of the fuel to be combusted, which in the engine configuration used during the experiments, was approximately 5 mm$^3$. At higher percentages (i.e. higher displacements for the present engine configuration), the spray visualization rig data as well as analysis using spray penetration models indicate that the diesel fuel stream issuing from the nozzle of the direct injector 26 will hit the wall of the combustion chamber 16. Further testing on the internal combustion engine 10 with the direct fuel injector 26 confirmed that early diesel control injection quantities above 5 percent of the fuel to be combusted appear to significantly increase smoke emissions of the engine. In addition, attempts to run the internal combustion engine 10 at early diesel control injection quantities of substantially 20 percent of the total fuel to be combusted (which was approximately 20 mm$^3$ in the present engine configuration) at relatively low intake manifold temperature was not successful. These specific experiments suggest significant quantities of early diesel control injection impinges on the cylinder wall at quantities exceeding about 5 percent of the total fuel to be combusted, which in these experiments was approximately 5 mm$^3$. Of course, it should be noted that many variables such as engine size and nozzle geometry would effect the allowable early control injection quantity and thus, other quantities may be appropriate in other engine configurations. In addition, it is noted that the term "total fuel" as used herein means the total of the first fuel and second fuel combined that is to be combusted during a combustion stroke of the piston assembly 14, the percentage amount being based on any measurable parameter. For instance, if the two fuels are conducive to being equivalently measured, the relative percentage amount of the directly injected second fuel as compared to the total fuel may be determined based on volume or mass. In other instances, the relative percentage amount of the second fuel relative to the total fuel may be determined based on energy content such as BTU or Joules, etc.

It should be emphasized that limiting the quantity of early diesel control injection to approximately 5 percent of the total fuel to be combusted severely limits the timing control of the SOC and consequently, limits the engine operating conditions which must exist in order to ensure effective PCCI combustion in the combustion chamber 16. For instance, such limitation on the quantity of early diesel control injection to approximately 5 percent of the total fuel restricts intake air and manifold temperatures, intake manifold pressures, equivalence ratio (ratio of fuel to air), and exhaust gas recirculation (EGR) rate settings under which the internal combustion engine 10 may be effectively operated in PCCI mode to attain desired timing of SOC and emission levels. Inversely, higher quantities of early diesel control injection will broaden the range of acceptable intake manifold temperature, intake manifold pressure, equivalence ratio and EGR rate settings, etc. thus extending the potential operating range of the internal combustion engine 10 in the PCCI mode. This broadened range is very desirable to accommodate speed, load, and thermal transients which is experienced by the internal combustion engine 10 during everyday operation.

The possibility of eliminating fuel impingement on the cylinder wall of the combustion chamber 16 by redesigning the nozzle of the direct fuel injector 26 has been recognized and considered by the present applicants. A possible solution is to provide the direct fuel injector 26 shown in FIG. 1 with lower included angle for the nozzle holes which would allow a greater amount of fuel to be injected while avoiding cylinder wall impingement by the second fuel 27. This would be a relatively easy solution to the impingement problem described above thereby aiding the SOC timing limitation in the "advanced" direction.

However, the present inventors have found that the above proposed solution has significant limitations. In particular, the direct fuel injector 26 should also accommodate other nozzle design parameters based on various other operating conditions so that the direct fuel injector 26 may be used in a variety of different engine modes to thereby maximize utility and minimize costs. For instance, in addition to the PCCI mode described above, the internal combustion engine 10 may be adapted to be operable under certain conditions in a pure diesel mode in which the direct fuel injector 26 is used more like a conventional diesel injector, or in a dual fuel mode in which both natural gas and diesel is combusted in some proportionate amounts such as 50% natural gas and 50% diesel. These conditions may include during start up, light load, heavy load operation, or other operating conditions.

Consequently, it would be desirable to provide a direct fuel injector 26 which is adapted to operate as both an early control injector when the internal combustion engine is operating in a PCCI mode, and as a regular diesel fuel injector when the internal combustion engine 10 is operating in a conventional diesel mode or a dual fuel mode. Unfortunately, injectors with nozzle holes having the lower included angle are not likely to function properly or optimally under the conventional diesel operating mode or in the dual fuel mode. Thus, the nozzle hole geometry of the direct fuel injector 26 should ideally be designed to provide early control injection but also be compatible to be used as conventional diesel injector nozzles. Otherwise, separate injectors must be provided to allow the internal combustion engine to be operable in various modes, such a requirement significantly increasing engine and manufacturing costs. Consequently, although small changes to the existing nozzle configuration may be accommodated, any radical redesign optimized for the sole purpose of optimizing early diesel control injection by the direct fuel injector 26 is not desirable. More likely, any direct fuel injector 26 for providing early diesel control injection would likely be provided with nozzle hole configurations that are substantially compatible with conventional diesel engines and operation thereby precluding very shallow included angle for the nozzle holes.

Figure 2:
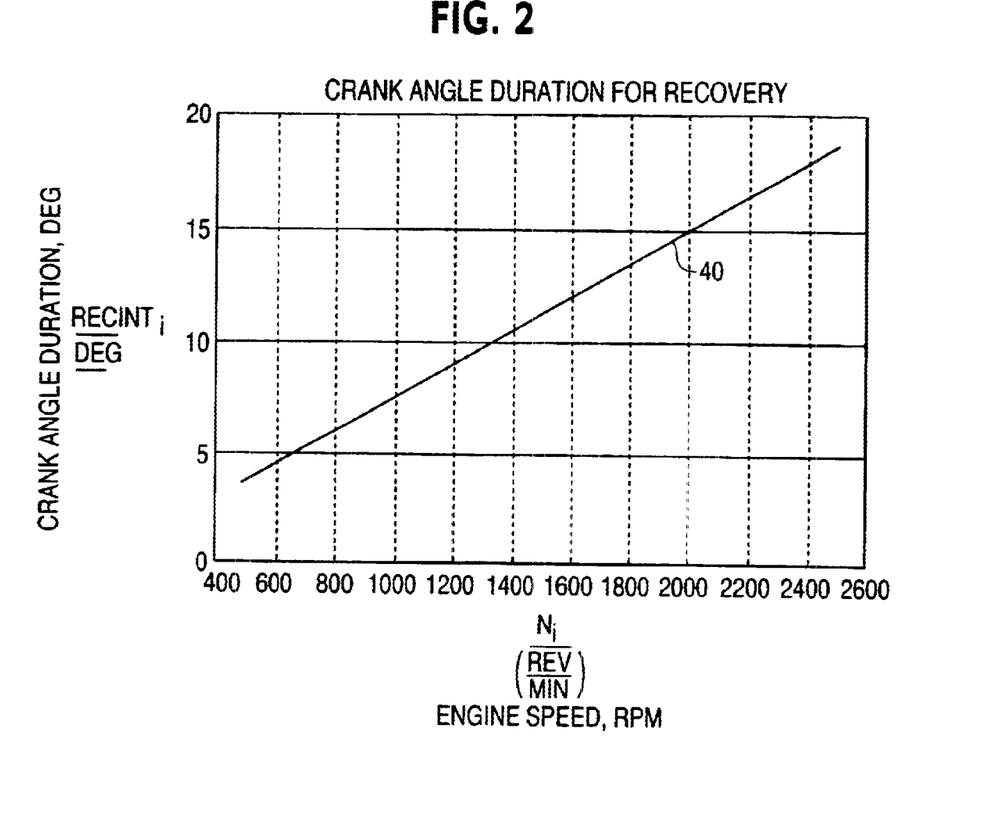
FIG. 2 shows a graph indicating the duration required for an injector to complete and recover from an early control injection as measured in crank angles.

In view of the above, the present inventors recognized that the common rail fuel injector used for the direct fuel injector 26 in the internal combustion engine 10 has a delivery time of about 500 μsec at 5000 psi rail pressure, a saturated coil time of about 300 μsec, and a recovery time of approximately 450 μsec. FIG. 2 illustrates a line 40 indicating the duration required for the Bosch® common rail fuel injector discussed above to complete and recover from an early control injection event of the present invention as measured in crank angles as a function of the speed of the engine 10. As can be seen, as the engine speed increases, the duration for recovery also increases substantially proportionately. Even at the engine speed of 2500 rpm, the overall injector event time for the direct fuel injector 26 to provide the early control injection is approximately 20 crank angle degrees. Thus, assuming that a "window" exists to provide the early control injection from the time of the intake valve opening to about 100 crank angle degrees before TDC which is a duration of about 280 crank angle degrees, the direct fuel injector 26 of FIG. 1 may be operated to provide as many as fourteen (14) early diesel control injections.

Thus, in accordance with the preferred embodiment of the present invention, the direct fuel injector 26 as shown in FIG. 1 is controlled by the ECU 30 in a manner to provide a plurality of early control injections prior to the initiation of SOC of the premixed charge in the combustion chamber 16. In addition, the direct fuel injector 26 is preferably controlled so that the quantity of diesel injected during each of the plurality of the early control injections is 10 percent of the total fuel to be combusted or less such as preferably 5 percent. Thus, by providing the plurality of early control injections in small amounts, the present invention avoids the likelihood of diesel fuel impinging upon the cylinder wall of the combustion chamber 16 while providing enough diesel fuel (second fuel) to accurately control the timing of the SOC of the premixed charge in a PCCI combustion event.

It should be noted that the above mentioned possible embodiment of providing as many as fourteen (14) early control injections does not take into account rail dynamics or other factors that may limit the response of the direct fuel injector 26. In addition, it is unlikely that such a high number of early diesel control injections would actually be used in commercial embodiments of the present invention. In this regard, based on the present applicants' experiments, two to four early diesel control injections will likely be sufficient to properly advance the timing of the SOC of the premixed charge in the most operating conditions of the internal combustion engine 10 operating in a PCCI mode. However, depending on the characteristics of the direct fuel injector 26, the attributes of the internal combustion engine 10 and the operating conditions, the direct fuel injector 26 may be operated to provide additional early diesel control injections into the combustion chamber 16. Moreover, it should be also noted that the early control injections of 5 percent of the total fuel to be injected (which in this case was approximately 5 mm$^3$) is merely one example as applied to the specific common rail fuel injector system and specific geometry of the combustion chamber 16 in the internal combustion engine 10. In other applications, the fuel injection systems and the engine will differ in specifications and hence, the amount of allowable fuel injected during the early control injections would also vary. In addition, whereas the 5 mm$^3$ amount of fuel was approximately 5 percent of the total fuel to be combusted in the load conditions and density, in other conditions, the quantity and/or the percentage may be different. For instance, each of the plurality of early control injections may be 10 mm$^3$ or even greater but the percentage of each of the early control injection in proportion to the total amount of fuel to be combusted should be maintained to be less than 10 percent, and preferably less than 5 percent.

The specific details as to the manner in which each of the plurality of early control injections interact with one another is not fully understood. The present applicants believe that with a single shot early control injection, the initial portion of the injected fuel issuing from each nozzle hole of the direct injector 26 drills a path through the premixed charge in the combustion chamber 16. This drilled path is believed to allow the subsequent portions of the injected fuel to penetrate further than the initial fuel. Consequently, each subsequent fuel particle has less energy dissipated near the nozzle holes and has more energy to progress within the combustion chamber 16 thus impinging on the cylinder wall of the combustion chamber 16.

However, if the two or more early control injections of the second fuel 27, each of which are less than 5 percent of the total fuel to be combusted are injected in accordance with the preferred embodiment of the present invention, thorough mixing of each of the early control injections can be promoted due to the turbulence within the combustion chamber 16. This turbulence likely breaks up the fuel plumes issuing from each nozzle hole of the direct fuel injector 26 during each of the plurality of early control injections to promote thorough mixing so that one early control injection is being mixed with the premixed charge by the time another early control injection is provided. This is especially true if the plurality of early control injections in accordance with the present embodiment is provided while the intake valve 20 is at least partially open and the piston assembly 14 is in its intake stroke since as the premixed charge is drawn into the cylinder, a great deal of turbulence is likely created in the region near the tip of the direct fuel injector 26. However, present inventors have also found it to be undesirable to have the plurality of early control injections impinge on the open intake valve 20. Thus, care should be taken to appropriately time the plurality of early control injections so as to minimize the possibility of impingement on the intake valve 20, for instance, through timing of the early control injections and/or optimization of nozzle geometry of the direct fuel injector 26.

Moreover, the two early control injections, each less than 10 percent of the total fuel and preferably 5 percent, may be separated by a time gap sufficient to allow mixing of a control injection prior to beginning another control injection and/or to allow the direct fuel injector 26 to recover from one control injection prior to beginning another control injection. By separating each of the plurality of early control injections with a time gap, each early control injection effectively takes place in a "fresh" mixture after the preceding early control injection is swept away from the nozzle of the direct fuel injector 26 down into the combustion chamber 16 by the turbulence of the premixed charge. Thus, the drilled path effect postulated above is not present further minimizing the possibility of impingement of diesel fuel. In this regard, the time gap in a range of 500 to 2500 $\mu$sec, for instance 1250 $\mu$sec, has been found to be sufficient in the illustrated embodiment of FIG. 1 to allow mixing of a control injection prior to beginning another control injection and also to allow the direct fuel injector 26 to recover from one control injection prior to beginning another control injection. In this manner, the required amount of early control injection of the second fuel can be provided to the combustion chamber 16 before significant exothermic reactions start to take place thereby allowing the control and advancement of the timing of SOC for the PCCI combustion. It should, however, be noted that in other embodiments or operating modes, some degree of stratification of the early control injection may also be beneficial.

In the above described manner, a plurality of early control injections may be provided by the direct fuel injector 26 shown in FIG. 1 to avoid impingement of the second fuel such as diesel on the cylinder wall of the combustion chamber 16 and to control the timing of the SOC during PCCI combustion. It should also be evident that the provided plurality of early control diesel injections can be used to control the temperature of the premixed charge during the compression stroke of the piston assembly 14 as well. Because in the illustrated embodiment of FIG. 1, it is possible to change the quantity of the second fuel 27 injected during the early diesel control injections, very rapid control of the SOC during the operation of the internal combustion engine 10 in a PCCI mode may be attained. In this regard, tests where early control injection was injected into the combustion chamber 16 at 100 crank angle degrees before TDC showed that 1 percent of the total fuel to be combusted such as 1 mm$^3$ of early diesel control injection in the present engine configuration, had approximately the same effect as changing the intake manifold temperature by 10° K. This is very advantageous since large changes in intake manifold temperature cannot be made quickly. It should also be appreciated that under light engine loads and idle conditions, the effect associated with the plurality of early control injections is further enhanced due to the lower quantity of premixed charge over which the energy from the early control injections must be distributed. Thus, the plurality of early control injections in accordance with the described embodiment may be used until appropriate engine parameter (s) such as the intake air or intake manifold temperature reaches a desired condition. Then, the plurality of early control injections may be minimized or eliminated once the desired condition is attained.

Figure 3:
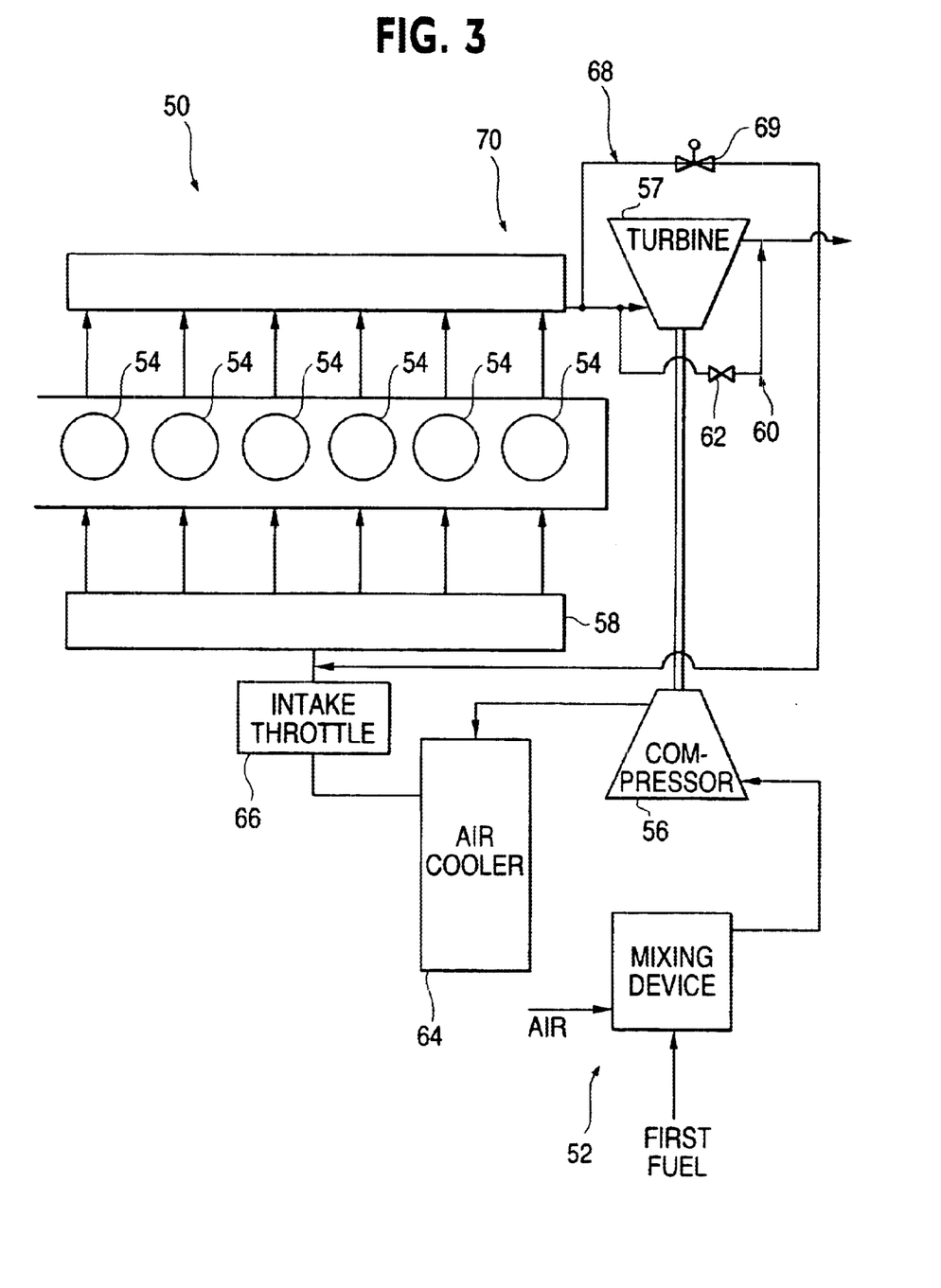
FIG. 3 is a schematic diagram of a multicylinder cylinder of an internal combustion engine in accordance with one embodiment of the present invention.

FIG. 3 shows a multi-cylinder internal combustion engine 50 in accordance with another embodiment of the present invention. The internal combustion engine 50 includes a mixing device 52 which performs the same function as the mixing device discussed above relative to FIG. 1 and provides a premixed charge to the plurality of cylinders 54. In this regard, the mixing device 52 may be a throttle body injector in the present illustrated embodiment but in other embodiments, may be a port fuel injector or a carburetor. A compressor 56 may be provided upstream of intake manifold 58 for boosting intake pressure. The compressor 56 may be driven by any conventional means, such as an exhaust gas driven turbine 57 which may preferably be a variable geometry turbine with adjustable vanes (not shown) that allow positional adjustment of the exhaust gas flowing through the turbine so that the rotation response of the turbine can be varied. A bypass circuit 60 including a waste gate valve 62 may be provided in a conventional manner to limit the amount of boost provided by the compressor 56. In addition, an optional exhaust throttle (not shown) may also be provided. A charge air cooler 64 may further be provided downstream of compressor 56 to cool the premixed charge before it enters the plurality of cylinders 54. The internal combustion engine 50 may also include an intake throttle 66 after the cooler 64 as shown in FIG. 3 and further includes an exhaust gas recirculation (EGR) system 68 which recirculates a portion of the exhaust gas into the intake in the manner shown, preferably downstream of the cooler 64. In this regard, the EGR system 68 includes an EGR valve 69 to control the amount of exhaust gas recirculated into the premixed charge. It should be noted that the intake throttle 66 may alternatively be positioned upstream of the charge air cooler 64 in other embodiments.

Each of the plurality of cylinders 54 of the internal combustion engine 50 of FIG. 3 preferably include a direct fuel injector (not shown) like that shown in FIG. 1 for providing at least one early control injection and preferably, a plurality of early control injections in the manner described above. In addition, the internal combustion engine 50 is adapted to be operable in multiple combustion modes such as in PCCI mode, in a pure diesel mode in which the direct fuel injector (not shown) of the cylinders 54 is used more like a conventional diesel injector, or in a dual fuel mode in which both natural gas and diesel is combusted in some proportionate amounts such as during start up, light load, heavy load operation, or other conditions.

In this regard, compressor 56, cooler 64, intake throttle 66 and the EGR system 68 as well as the mixer 52, are preferably controlled by an ECU (not shown) like that shown in FIG. 1 in a manner described herein below to aid in controlling the combustion and timing of SOC of the premixed charge provided by the mixing device 52. For example, a bypass valve or waste gate 62 of the bypass circuit 60 could be controlled by the ECU to regulate the amount of exhaust gas supplied from the associated exhaust system 70 to the turbine 57 thereby regulating the compressor 56 to vary the intake pressure as desired. Similarly, the EGR valve 69 of the EGR system 68 may be controlled by the ECU to vary both composition and temperature of the premixed charge combusted in the combustion chambers of the cylinders 54. Likewise, a control valve (not shown) could be provided in the cooler 64 and controlled by the ECU to permit variable control of the cooling effect of cooler 64 while linkages and throttle plates known in the art could be controlled by the ECU to operate the intake throttle 66 to vary the throttling of the premixed charge. Thus, the internal combustion engine 50 can be controlled by an ECU (not shown) to variably control of the composition, pressure and temperature of the premixed charge on a cycle-by-cycle basis in conjunction with at least one early control injection in accordance with the present invention to thereby control the PCCI combustion characteristics such as timing of SOC to optimize fuel efficiency and reduce emissions.

A control strategy is discussed herein below that can be used attain the goal of fuel efficiency and reduced emissions, especially during light load applications or during transitioning periods when the internal combustion engine 50 of FIG. 3 is transitioned from one operating mode such as in diesel mode or dual fuel mode, to another operating mode such as PCCI mode. It should initially be noted that an extensive discussion of varies strategies for operating and controlling an engine operable in PCCI mode is presented in an application entitled "Multiple Operating Mode Engine And Method Of Operation" filed concurrently with the present application on May 8, 2001 (Docket No. 740270-2697; Ser. No. Unknown), the entire contents of which is hereby incorporated by reference.

In the present control strategy described below, the direct fuel injector performs the function of providing both the plurality of early control injections as well as providing the diesel fuel during the diesel mode or dual fuel mode operation in the manner previously discussed. It is again noted that whereas the first fuel is natural gas and the second fuel is diesel in the embodiment of FIG. 3, other fuels or blends thereof may also be used. In the present control strategy, during the operation of the internal combustion engine 50, the relative proportions of the natural gas and the diesel fuel may be widely varied. The control of the mixing device 52 that provides the natural gas of the premixed charge and the direct fuel injector (not shown) that provides the diesel fuel as well as the plurality of early control injections may be based on an operating condition of the internal combustion engine 50 such as temperature, load, speed, throttle position, fuel quality etc. and/or as otherwise directed by the operator. In this regard, the proportions of the natural gas (first fuel) and the diesel fuel (second fuel) may be pre-programmed in a look up table or otherwise calculated by the ECU.

For instance, in certain operating conditions or operating modes of the internal combustion engine 50, the proportionate amount of the natural gas provided to the combustion chambers of the cylinders 54 by the mixing device 52 may be very small such as 1% of the total fuel to be combusted while the proportionate amount of the diesel provided by the direct injector is very large such as 99% of the total fuel to be combusted in the combustion chamber. Instances in which such proportionate amount of natural gas and diesel may be provided can be during starting of the internal combustion engine, during light or heavy loads, or during cold engine temperature operation where PCCI combustion of the premixed charge may be difficult to attain. In a similar manner to usage above, the term "total fuel" as used herein means the total of the first fuel and second fuel combined based on any measurable parameter. For instance, if the two fuels are conducive to being equivalently measured, the percentage amount of the first fuel and the second fuel relative to the total fuel may be determined based on volume or mass. In other instances, the percentage amount of the fuels relative to the total fuel may be determined based on energy content such as BTU or Joules, etc.

Inversely, in other operating conditions or operating modes of the internal combustion engine 50, the proportionate amount of natural gas (first fuel) provided by the mixing device 52 may be very large such as 99.9% of the total fuel to be combusted while the proportionate amount of the diesel (second fuel) injected by the direct fuel injector is very small such as 0.1% of the total fuel to be combusted in the combustion chamber. Instances in which such proportionate amount of the first fuel and the second fuel may be provided can be during substantially steady state operation of the internal combustion engine during which fuel efficiency and reduced emissions as well as other advantages of PCCI combustion can be fully realized. Of course, the above two scenarios are extreme examples to generally illustrate an example range of the proportionate amounts of first fuel and the second fuel and the internal combustion engine 50 may be operated in a mode in which the proportionate amounts is somewhere in between these above extreme examples.

In accordance with one embodiment of the control strategy for operating the internal combustion engine 50, as the load on the internal combustion chamber 50 changes upwardly or downwardly, the amount of premixed charge provided to the intake manifold 58 is correspondingly changed utilizing one or more of the fuel flow of the first fuel, the throttle 66, the position of the adjustable vanes of the turbine 57, the position of the waste gate 62, and/or the optional exhaust throttle (not shown). In this regard, the above noted parameters may be varied as needed to control the combustion characteristics and SOC while maintaining a relatively constant equivalence ratio of the premixed charge, i.e. the fuel to air ratio divided by the stoichiometric fuel to air ratio. An equivalence ratio of approximately 0.25 to 0.5, and preferably 0.3 to 0.4, has been found to be an effective equivalence ratio range that allows the combustion characteristics such as the timing of the SOC to be controlled using the above noted parameters and the plurality of early control injections. By using the above discussed control strategy, the mixing device 52 can be relatively simple and simply controlled by an ECU (not shown) or the like to merely maintain the equivalence ratio. Of course, in other embodiments, different equivalence ratios can also be used or may be adjusted depending on various conditions including fuel quality, fuel composition, humidity, ambient and operating temperatures, etc.

As the load decreases, the proportionate amount of fuel provided by the second fuel such as diesel injected during the plurality of early control injections is increased to advance the timing of the SOC and to keep the SOC at the target crank angle. In view of the prior discussion, the early control injection is preferably provided in a plurality of early control injections so that the injected diesel does not impinge on the cylinder wall of the cylinders 54. However, as the proportionate amount of the second fuel injected during the plurality of early control injections is increased, the equivalence ratio of premixed charge is maintained relatively constant and as a result, the overall equivalence ratio increases due to the richer mixture thus resulting in higher peak cycle temperatures and NOx emissions. Of course, it should also be noted that such increases in the amount of second fuel injected during the plurality of early control injections may be required not only based on loads on the internal combustion engine 50, but other conditions as well including fuel quality, fuel composition, humidity, ambient and operating temperatures, etc.

Figure 4:
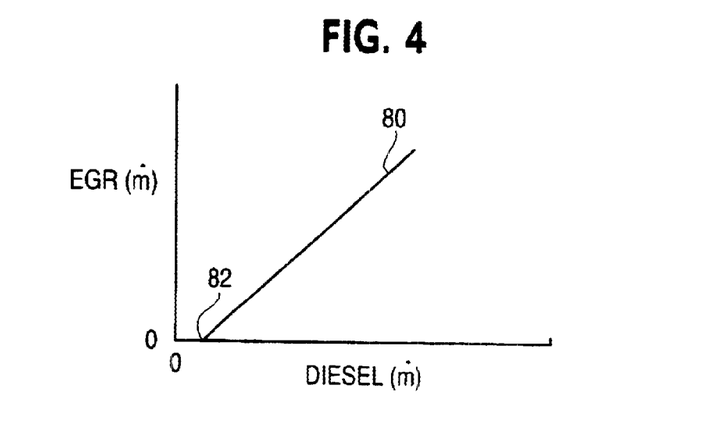
FIG. 4 shows a graph indicating the mass flow rate of early control fuel injected and the corresponding mass flow rate of EGR provided to the intake air.

In accordance with another embodiment, a control strategy may be used wherein as the amount of fuel injected during early control injection is increased, EGR gas is added to the premixed charge in the intake manifold via the EGR system 68. The mass flow rate of the EGR gas added may be proportional to the mass flow rate of the diesel fuel injected during the plurality of early control injections. FIG. 4 shows a line 80 indicating the mass flow rate of the second fuel (diesel) injected during the plurality of early control injections in accordance with the present invention (x-axis) and the corresponding mass flow rate of EGR gas (y-axis) provided to the intake air in accordance with the present control strategy. As can be seen, in the preferred embodiment, the line 80 is substantially linear and proportionate so that the relative change in mass flow rate of the EGR gas is changed substantially constant relative to the change in mass flow rate of the early control injections. In addition, base point 82 of the line 80 shows that in the present control strategy, there is a base level of early control injection mass flow rate at which the EGR gas is introduced into the premixed charge. Thus, below this base point 82 mass flow rate, no EGR gas is introduced into the premixed charge.

The relative mass flow rates of the intake air, natural gas, EGR gas and the plurality of early diesel control injections can be based on the following approximation:

$$\frac{\dot{m}_{air}}{\dot{m}_{N.G.} \cdot LHV_{N.G.}} \approx \text{constant} \approx \frac{\dot{m}_{air} + \dot{m}_{EGR}}{\dot{m}_{N.G.} \cdot LHV_{N.G.} + \dot{m}_{diesel} \cdot LHV_{diesel}}$$

where the $LHV_{NG}$ and $LHV_{diesel}$ are the lower heating values of the natural gas and the diesel fuel respectively.

The above provided equation assumes that the baseline early diesel early control injections is much smaller than the natural gas mass flow rate when the EGR mass flow rate is very small. From the above noted equation, it can also be determined that:

$$\frac{\dot{m}_{air}}{\dot{m}_{N.G.} \cdot LHV_{N.G.}} \approx \frac{\dot{m}_{EGR}}{\dot{m}_{diesel} \cdot LHV_{diesel}}$$

However, in other embodiments, the mass flow rate of the EGR gas may be changed relative to the change in mass flow rate of the early control injections so that the line is non-linear or at a different slope. Likewise, the base point 82 may also be changed so that EGR gas is provided immediately when the early control injections are provided.

The mass flow rates at which the EGR gas and the plurality of early diesel control injections are added is preferably chosen in such a way that the peak cycle temperature is near the optimum temperature at all loads and engine operating speeds. This peak cycle temperature, while not perfectly constant, may be approximately 2000° K which has been found to be very desirable in many PCCI combustion operating conditions. It should also be noted that the peak cycle temperature need not be directly measured. Instead, other related parameters may be measured do determine the correlated peak cycle temperature. For instance, heat release rate, SOC, knock intensity, equivalence ratio, exhaust temperature and/or emissions may be measured and used to determine the peak cycle temperature. In the above described manner, the EGR system 68 may be used to control the mass flow rate of the EGR gas to maintain the peak cycle temperature and to assist in maintaining the desired SOC for any given operating condition since the addition of the EGR gas to the intake increases the intake temperature which advances timing of SOC. The EGR gas provided to the intake can also act as diluent to achieve or maintain the target peak cycle temperature discussed above. Moreover, if the load on the internal combustion engine 50 is reduced while maintaining a relatively constant equivalence ratio and the previously described plurality of early diesel control injections are used to maintain the desired SOC, the peak cycle temperatures may increase possibly beyond the optimal 2000° K range noted above. To offset such an increase in the peak cycle temperatures, the appropriate amount of EGR gas may be added to lower the peak cycle temperatures to be near the optimal temperature.

One advantageous feature of the above described control strategy is that the addition of the plurality of early diesel control injections and the addition of EGR reinforce each other in terms of being able to advance SOC as load on the internal combustion engine 50 decreases. In other words, because hot EGR gas is added with the early diesel control injections, less amount of diesel fuel is required during the early diesel control injections to attain the desired combustion characteristics such as the timing of SOC. Another advantageous feature is that a very simple control scheme is provided for controlling the natural gas flow. More specifically, the mixing device 52 may be controlled by the ECU so that just enough natural gas is added to achieve a target equivalence ratio for the premixed charge as described above. Thus, in this embodiment, complicated strategies for proper equivalence ratios during transient operation of the internal combustion engine 50 can be avoided. Of course, in other embodiments, some additional enrichment of the premixed charge may be provided during such transient operations. Furthermore, the plurality of early diesel control injections and the amount of EGR gas can be easily and quickly modulated to maintain the timing of the SOC of the premixed charge at a desired crank angle position.

In addition, if the load on the internal combustion engine 50 drops or the speed increases, there will be a tendency for the SOC of the premixed charge to retard and ignite later in the combustion cycle. In addition to the plurality of early control injections and providing the EGR gas as described above, the throttle 66, and or the bypass system 60 may be accordingly adjusted to deliver the required premixed charge and boosted to the intake manifold 58 of the internal combustion engine 50 to maintain the desired timing of the SOC.

Another control strategy for the start-up and operation of an internal combustion engine 50 of FIG. 3 is discussed herein below. In the embodiment where the first fuel such as natural gas is mixed with the intake air by the mixing device 52 upstream of the compressor 56, it may be desirable to allow the internal combustion engine 50 to start in a pure diesel mode before introducing the premixed charge from the mixing device 52. As previously noted, this can be attained using the direct fuel injector (not shown) which is provided in the combustion chamber of each of the cylinders 54. This may be desirable to ease startability of the engine 50 and to avoid excessive hydrocarbon emissions prior to attaining stable PCCI combustion.

Where the premixed charge at a constant equivalence ratio of approximately between 0.3 and 0.4 is to be added after the start of the engine 50 as described above, the internal combustion engine 50 may be started in a standard diesel mode but with the intake throttled via the intake throttle 66. The initial throttle position of the intake throttle 66 may be chosen so as to achieve a target idle speed with some predetermined fueling proportions between the first and second fuels such as natural gas and diesel respectively. For instance, 50 percent of the fuel may be natural gas and the remaining 50 percent of the fuel may be diesel which is directly injected in the cylinders 54 by the direct fuel injector that is also adapted to inject the plurality of early control injections as described previously. A speed governor (not shown) may be used to control the amount of diesel fuel injected during this stage. Of course, other fuels and fueling proportions may be used as well depending on the application and conditions. As the premixed charge is provided to the combustion chamber of the cylinders 54, the output of the internal combustion engine 50 would increase somewhat abruptly. However, such abrupt increase in output is masked by the engine's 50 normal acceleration to idle speed.

Once the internal combustion engine 50 reaches a predetermined idle speed operating in the dual fuel mode, the ECU (not shown) can increase the temperature of the premixed charge using a the EGR gas via the EGR system 68 and/or the plurality of early control injections in the manner previously described. It should be noted that the temperature of the premixed charge may also be increased using an optional air heater (not shown), varying compression ratio and/or by varying valve timing. It should also be noted that in other embodiments, it may be advantageous to start the engine with the intake throttle 66 wide open. If such is the case, the above described control strategy can be used by closing the intake throttle 66 to the initial position described above once the internal combustion engine 50 reaches a predetermined threshold speed between cranking and idle speeds.

The compression temperature of the premixed charge may then be raised to the point where a significant portion of the premixed charge ignites with the aid of a late diesel pilot injection provided near the TDC by the direct fuel injector in the manner known. In other words, the late diesel pilot injection assists the ignition of the premixed charge in a manner known in the related arts to thereby operate the internal combustion engine 50 in a late pilot assisted mode which is not true PCCI combustion. At this point, the ECU may decrease the proportion of diesel injected by the direct injectors while increasing the amount of premixed charge that is provided to the cylinders so that more natural gas is combusted in PCCI combustion and less diesel fuel is injected. This is preferably done gradually while modulating the intake throttle 66 so as to maintain a substantially constant output parameter such as engine speed or horsepower. The reduction of diesel fuel injected is preferably continued until the amount of diesel injected is a minimum amount required to ensure reliable and robust late pilot assisted PCCI combustion of the premixed charge.

With the internal combustion engine 50 idling in late pilot assisted PCCI mode with minimal diesel injection, the plurality of early diesel control injections in accordance with the present invention may then be provided optionally with EGR gas or other parameters discussed above to advance the timing of the SOC so that the SOC occurs before the late pilot injection and the internal combustion engine 50 is operating in a true PCCI mode where the premixed charge is autoignited by pressure without the need for the late pilot injection. When the timing of the SOC of the premixed charge is sufficiently advanced enough to ensure consistent PCCI combustion, the late pilot injection can be terminated. Optionally, the late pilot injection may be maintained to aid in controlling the PCCI combustion and emission. If the late pilot injection is terminated, the intake throttle 66 may be opened slightly more to provide more premixed charge to compensate for the missing diesel and to maintain the idle. In this manner, the internal combustion engine 50 may be readily controlled so as to allow optimized operation in a PCCI mode with increased fuel efficiency and reduced emissions. Of course, as the operating conditions change to be more favorable to PCCI mode, event the early control injections may be discontinued and the internal combustion engine 50 operated solely in PCCI mode to maximize fuel efficiency while minimizing exhaust emissions.

If necessary, the internal combustion engine 50 may be transitioned back into the dual-fuel mode by reversing the above described control strategy. Thus, a late diesel pilot injection would be provided near the TDC and the plurality of early diesel control injections would be reduced to zero while the quantity of diesel provided during the late injection would be increased to maintain the desired output from the internal combustion engine 50. The ECU (not shown) would then close the intake throttle 66 and increase the quantity of the late diesel injection so as to achieve the desired fueling proportions between the primary and the secondary fuels while maintaining constant output.

It should also be appreciated that because the internal combustion engine 50 includes a plurality of cylinders 54, the ECU (not shown) may be adopted to change the relative proportions of the first and second fuels for each cylinder separately. For instance, fewer than all of the plurality of cylinders at a time may be transitioned from one operation mode to another mode in the manner discussed in detail above to thereby further facilitate smooth transitioning of the operation mode of the internal combustion engine 50.

In the above described manner, the present invention allows increased fuel economy and reduced exhaust emissions by providing an internal combustion engine with a direct fuel injector adapted to inject at least one early control injection and preferably, a plurality of early control injections, to allow precise control of the timing of the SOC without impinging of the early control injection on the cylinder walls. In addition, the control strategies described above may be used to effectively operate the internal combustion engine in the PCCI mode as well as during start-up, dual fuel mode and during transitioning between these and other modes of operation. The internal combustion engine in accordance with the present invention may thus be controlled using one or more of the control strategies discussed above in conjunction with the early control injection discussed above, preferably plurality of early control injections, so that rapid, cycle-to-cycle control of the timing of the SOC can be attained.

While various embodiments in accordance with the present invention have been shown and described, it is understood that the invention is not limited thereto. For instance, whereas specific embodiments of the internal combustion engine has been used to explain the present invention where the first fuel is natural gas and the second fuel is diesel, the present invention should not be limited to this combination of fuels. In this regard, other fuels such as gasoline, propane, naphtha, kerosene, other fuels and/or combinations thereof may also be used. Thus, present invention may be changed, modified and further applied by those skilled in the art. Therefore, this invention is not limited to the detail shown and described previously, but also includes all such changes and modifications.

We claim:

1. An internal combustion engine operable in a premixed charge compression ignition mode with at least a portion of fuel combusted in a premixed charge compression ignition combustion event, comprising:
   an engine body with a piston assembly;
   a combustion chamber formed in said engine body by said piston assembly;
   an intake system for delivering intake air to said combustion chamber during an intake stroke of said piston assembly;
   a mixing device that mixes a first fuel with said intake air to provide a premixed charge of air and said first fuel;
   a direct fuel injector adapted to directly inject a second fuel into said combustion chamber; and
   a control system adapted to control said direct fuel injector in a manner to provide at least one early control injection of said second fuel into said combustion chamber before start of the premixed charge compression ignition combustion event.

2. The internal combustion engine of claim 1, wherein said at least one early control injection of said second fuel is injected into said combustion chamber during at least one of said intake stroke and a compression stroke during which said premixed charge is compressed in said combustion chamber.

3. The internal combustion engine of claim 2, wherein said at least one early control injection of said second fuel is injected into said combustion chamber during said intake stroke of said piston assembly.

4. The internal combustion engine of claim 1, wherein said control system is further adapted to control at least one of injection timing, injection duration, injection rate and injection amount of said early control injection.

5. The internal combustion engine of claim 1, wherein said control system is further adapted to variably control amount of said second fuel injected during said early control injection by said direct fuel injector based on at least one of an operating condition and operating mode of said internal combustion engine.

6. The internal combustion engine of claim 1, wherein timing and amount of said at least one early control injection is variably controlled based on desired timing of start of combustion of said premixed charge.

7. The internal combustion engine of claim 1, wherein said at least one early control injection is less than 10 percent of the total fuel to be combusted.

8. The internal combustion engine of claim 7, wherein said at least one early control injection is less than 5 percent of the total fuel to be combusted.

9. The internal combustion engine of claim 1, wherein said first fuel and said second fuel are different types of fuels.

10. The internal combustion engine of claim 9, wherein at least one of said first fuel and said second fuel is at least one of diesel, natural gas, gasoline, propane, naphtha, and kerosene.

11. The internal combustion engine of claim 1, wherein said mixing device includes at least one of a carburetor, a throttle body injector, and a port fuel injector that is adapted to mix air and said first fuel upstream of said combustion chamber.

12. The internal combustion engine of claim 1, wherein said at least one early control injection is a plurality of early control injections.

13. The internal combustion engine of claim 12, wherein said plurality of early control injections of said second fuel is injected into said combustion chamber during at least one of said intake stroke and a compression stroke during which said premixed charge is compressed in said combustion chamber.

14. The internal combustion engine of claim 13, wherein said control system is further adapted to control at least one of injection timing, injection duration, injection rate and injection amount of each of said plurality of early control injections.

15. The internal combustion engine of claim 14, wherein said control system is further adapted to variably control amount of said second fuel injected during each of said plurality of early control injections by said direct fuel injector based on at least one of an operating condition and operating mode of said internal combustion engine.

16. The internal combustion engine of claim 14, wherein timing and amount of said plurality of early control injections is variably controlled based on desired timing of start of combustion of said premixed charge.

17. The internal combustion engine of claim 14, wherein said first fuel is natural gas and said second fuel is diesel.

18. The internal combustion engine of claim 14, wherein said engine body includes a plurality of cylinders each having a piston assembly that forms a combustion chamber, said control system being further adapted to vary an amount of said second fuel injected by said direct fuel injector during said plurality of early control injections to fewer than all of said plurality of cylinders at a time.

19. The internal combustion engine of claim 12, wherein each of said plurality of early control injections are less than 10 percent of the total fuel to be combusted.

20. The internal combustion engine of claim 19, wherein each of said plurality of early control injections are less than 5 percent of the total fuel to be combusted.

21. The internal combustion engine of claim 12, wherein each of said plurality of early control injections are separated by a time gap.

22. The internal combustion engine of claim 21, wherein said time gap between each of said plurality of early control injections are sufficient to allow mixing of an early control injection prior to beginning another early control injection.

23. The internal combustion engine of claim 21, wherein said time gap between each of said plurality of early control injections are sufficient to allow said direct fuel injector to recover from an early control injection prior to beginning another early control injection.

24. The internal combustion engine of claim 21, wherein said time gap is between 500 $\mu$sec and 2500 $\mu$sec.

25. The internal combustion engine of claim 24, wherein said time gap is approximately 1250 $\mu$sec.

26. A method of operating an internal combustion engine in a premixed charge compression ignition mode where at least a portion of fuel is combusted in a premixed charge compression ignition combustion event, said internal combustion engine having a piston assembly defining a combustion chamber, comprising the steps of:
   delivering at least intake air to said combustion chamber during an intake stroke of said piston assembly;
   mixing a first fuel with said intake air to provide a premixed charge of air and said first fuel;
   performing a compression stroke of said piston assembly after said intake stroke;
   igniting said premixed charge; and
   directly injecting at least one early control injection of a second fuel into said combustion chamber before start of the premixed charge compression ignition combustion event.

27. The method of claim 26, further comprising the step of injecting said at least one early control injection into said combustion chamber during at least one of said intake stroke and a compression stroke during which said premixed charge is compressed in said combustion chamber.

28. The method of claim 27, wherein said at least one early control injection is injected into said combustion chamber during said intake stroke of said piston assembly.

29. The method of claim 27, further comprising the step of controlling at least one of injection timing, injection duration, injection rate and injection amount of said at least one early control injection.

30. The method of claim 29, further comprising the step of variably controlling amount of said second fuel injected during said at least one early control injection by said direct fuel injector based on at least one of an operating condition and operating mode of said internal combustion engine.

31. The method of claim 29, further comprising the step of variably controlling timing and amount of said at least one early control injection based on desired timing of start of combustion of said premixed charge.

32. The method of claim 27, wherein said first fuel and said second fuel are different types of fuels.

33. The method of claim 32, wherein at least one of said first fuel and said second fuel is at least one of diesel, natural gas, gasoline, propane, naphtha, and kerosene.

34. The method of claim 33, wherein said first fuel is natural gas and said second fuel is diesel.

35. The method of claim 27, wherein said at least one early control injection is a plurality of early control injections.

36. The method of claim 35, further comprising the step of injecting said plurality of early control injections into said combustion chamber during at least one of said intake stroke and a compression stroke during which said premixed charge is compressed in said combustion chamber.

37. The method of claim 36, further comprising the step of controlling at least one of injection timing, injection duration, injection rate and injection amount of each of said plurality of early control injections.

38. The method of claim 37, further comprising the step of variably controlling amount of said second fuel injected during each of said plurality of early control injections by said direct fuel injector based on at least one of an operating condition and operating mode of said internal combustion engine.

39. The method of claim 37, further comprising the step of variably controlling timing and amount of said plurality of early control injections based on desired timing of start of combustion of said premixed charge.

40. The method of claim 35, wherein each of said plurality of early control injections are less than 10 percent of the total fuel to be combusted.

41. The method of claim 40, wherein each of said plurality of early control injections are less than 5 percent of the total fuel to be combusted.

42. The method of claim 35, wherein each of said plurality of early control injections are separated by a time gap.

43. The method of claim 42, wherein said time gap is sufficient to allow mixing of a control injection prior to beginning another control injection.

44. The method of claim 42, wherein said time gap is sufficient to allow said direct injector to recover from a control injection prior to beginning another control injection.

45. The method of claim 42, wherein said time gap is between 500 $\mu$sec and 2500 $\mu$sec.

46. The method of claim 45, wherein said time gap is approximately 1250 $\mu$sec.

47. The method of claim 40, wherein said internal combustion engine includes a plurality of cylinders each having a piston assembly that forms a combustion chamber, further comprising the step of varying an amount of said second fuel injected by said direct fuel injector during said plurality of early control injections to fewer than all of said plurality of cylinders at a time.

* * * * *